United States Patent
Sträng et al.

(10) Patent No.: US 12,057,008 B2
(45) Date of Patent: Aug. 6, 2024

(54) TRANSIT INDICATOR DEVICE, USER GUIDANCE SYSTEM AND ASSOCIATED METHOD OF GUIDING A LOCAL USER AT A CABLE, PIPE OR WIRE TRANSIT

(71) Applicant: ROXTEC AB, Karlskrona (SE)

(72) Inventors: Daniel Sträng, Karlskrona (SE); Mattias Persson, Karlskrona (SE)

(73) Assignee: ROXTEC AB, Karlskrona (SE)

( * ) Notice: Subject to any disclaimer, the term of this patent is extended or adjusted under 35 U.S.C. 154(b) by 602 days.

(21) Appl. No.: 17/255,548

(22) PCT Filed: Jun. 19, 2019

(86) PCT No.: PCT/SE2019/050583
§ 371 (c)(1),
(2) Date: Dec. 23, 2020

(87) PCT Pub. No.: WO2020/005140
PCT Pub. Date: Jan. 2, 2020

(65) Prior Publication Data
US 2021/0272425 A1    Sep. 2, 2021

(30) Foreign Application Priority Data
Jun. 27, 2018 (SE) .................................... 1850802-8

(51) Int. Cl.
*B60R 1/12* (2006.01)
*F16L 5/08* (2006.01)
(Continued)

(52) U.S. Cl.
CPC .................. *G08B 5/36* (2013.01); *F16L 5/08* (2013.01); *H02G 1/00* (2013.01); *H02G 3/02* (2013.01); *H02G 3/22* (2013.01)

(58) Field of Classification Search
USPC .. 340/815.4, 907, 426.13, 426.15, 464, 525, 340/636.11, 687, 815.42
See application file for complete search history.

(56) References Cited

U.S. PATENT DOCUMENTS 4,130,925 A * 12/1978 Gibson .................. F16L 1/026
228/103
6,688,910 B1    2/2004 Macauley
(Continued)

FOREIGN PATENT DOCUMENTS

CN    102292889 A    12/2011
CN    107923985 A    4/2018
(Continued)

OTHER PUBLICATIONS

Office Action for corresponding Japanese application No. 2020-571454 dated Jan. 10, 2023 (6 pages).
(Continued)

*Primary Examiner* — Daniel Previl
(74) *Attorney, Agent, or Firm* — Merchant & Gould P.C.

(57) ABSTRACT

Disclosed is a user guidance system (2) for cable, pipe or wire transits (1; 1a . . . 1n; 400) of a type which has one or more transit elements (10, 20, 30, 40; 42; 400) to form a sealed installation of one or more cables (7), pipes or wires. The user guidance system (2) comprises a communication network (60; 60a-c; 61, 61a-n, 62), and a computer resource (70) which is connectable to the communication network. The user guidance system (2) also comprises a plurality of transit indicator devices (50; 50a-50n; 250; 350; 450), each being connectable to the communication network (60; 60a-c; 61, 61a-n, 62) and each being located at or within a respective transit (1a-1n). The computer resource (70) is configured to receive a command (74) from an authorized user (4), and in response send a remote instruction (76) to one or more of the plurality of transit indicator devices (50;
(Continued)

50a-50n; 250; 350; 450) over the communication network (60; 60a-c; 61, 61a-n, 62). This causes the receiving one or more transit indicator devices (50; 50a-50n; 250; 350; 450) to provide a visual indication for guiding a local user (3) at the respective transit(s) (1a-1n) where the one or more transit indicator devices (50; 50a-50n; 250; 350; 450) is/are located.

26 Claims, 9 Drawing Sheets

(51) Int. Cl.
*G08B 5/36* (2006.01)
*H02G 1/00* (2006.01)
*H02G 3/02* (2006.01)
*H02G 3/22* (2006.01)

(56) References Cited

U.S. PATENT DOCUMENTS

| | | | |
|---|---|---|---|
| 8,681,176 | B1 | 3/2014 | Maurer et al. |
| 9,568,613 | B2 | 2/2017 | Droba et al. |
| 10,271,766 | B1* | 4/2019 | Parker, Jr. ............ A61B 5/0833 |
| 2001/0025883 | A1* | 10/2001 | Ichihara ............ G07F 17/0014 |
| | | | 235/381 |
| 2005/0270175 | A1* | 12/2005 | Peddie ............ G08G 1/096783 |
| | | | 246/473 R |
| 2008/0100487 | A1 | 5/2008 | Downie et al. |
| 2008/0177171 | A1 | 7/2008 | Francesangeli et al. |
| 2008/0220721 | A1 | 9/2008 | Downie et al. |
| 2010/0013600 | A1 | 1/2010 | Renfro |
| 2015/0113458 | A1* | 4/2015 | Mann ................ G01C 21/3614 |
| | | | 715/771 |
| 2017/0073085 | A1* | 3/2017 | Tremblay ................ B64F 1/125 |
| 2017/0173262 | A1* | 6/2017 | Veltz ...................... G16H 20/17 |
| 2018/0031396 | A1* | 2/2018 | Bohlin ............... G06K 17/0022 |

FOREIGN PATENT DOCUMENTS

| | | |
|---|---|---|
| JP | 2010521031 A | 6/2010 |
| JP | 2010220161 A | 9/2010 |
| JP | 2018510421 A | 4/2018 |
| RU | 2200895 C2 | 3/2003 |
| RU | 2447560 C2 | 4/2012 |
| SE | 538871 C2 | 1/2017 |
| TW | 200919210 A | 5/2009 |
| WO | 2010/090581 A1 | 8/2010 |
| WO | 2016/140613 A1 | 9/2016 |

OTHER PUBLICATIONS

Chinese Office Action for CN Application No. 201980042708.4 mailed Feb. 22, 2022 (23 pages, with English translation).
Indian Examination Report for IN Application No. 202027055033 mailed Sep. 6, 2022 (5 pages with English translation).
Russian Office Action for RU Application No. 2021101338/07 mailed Sep. 20, 2022 (12 pages).
International Search Report for International Application PCT/ESE2019/050583 mailed Aug. 8, 2019 (4 pages).

* cited by examiner

TRANSIT INDICATOR DEVICE, USER GUIDANCE SYSTEM AND ASSOCIATED METHOD OF GUIDING A LOCAL USER AT A CABLE, PIPE OR WIRE TRANSIT

This application is a National Stage Application of PCT/SE2019/050583, filed 19 Jun. 2019, which claims benefit of Serial No. 1850802-8, filed 27 Jun. 2018 in Sweden and which applications are incorporated herein by reference. To the extent appropriate, a claim of priority is made to each of the above disclosed applications.

TECHNICAL FIELD

The present invention generally relates to the field of sealed installations of cables, pipes or wires, and more particularly to equipment for guiding local users at such transits. Even more specifically, the present invention relates to a transit indicator device for use at or within a cable, pipe or wire transit, to a user guidance system for cable, pipe or wire transits where the system comprises a plurality of transit indicator devices being located at or within a respective transit, and to a method of guiding a local user at a cable, pipe or wire transit.

BACKGROUND

Sealed installations of cables, pipes or wires are commonly used in many different environments, such as for cabinets, technical shelters, junction boxes and machines. They are used in a variety of different industries, such as automotive, telecom, power generation and distribution, as well as marine and offshore. The sealed installations serve to seal effectively against fluid, gas, fire, rodents, termites, dust, moisture, etc., and may involve cables for electricity, communication, computers, etc., pipes for different gases or liquids such as water, compressed air, hydraulic fluid and cooking gas, and wires for load retention.

The present applicant is a global leader in the development of cable, pipe or wires transits for sealing purposes. A transit, which may also be referred to as a lead-through, is made up of one or more transit elements, typically a plurality of different transit elements which upon installation at a site are assembled into a sealed installation of one or more cables, pipes or wires. One commonly used transit type has an essentially rectangular frame, inside of which a number of modules are arranged to receive cables, pipes or wires. The modules are made of an elastic material, such as rubber or plastics, and are thus compressible and moreover adaptable to different outer diameters of the cables, pipes or wires. The modules are typically arranged side by side in one or more rows together with some kind of compression unit. The compression unit is placed between the frame and the modules in such a way that when the compression unit is expanded, the compressible modules will be compressed around the cables, wires or pipes. For ease of description, the term "cable" will be mainly used in this document, but it should be construed broadly and a person skilled in the art will realise that it normally also covers pipes or wires, or is an equivalent thereof.

Another type of transit has an essentially cylindrical form and is to be received in a sleeve, also known as a pipe sleeve, in a wall or an opening in a wall. To function in the desired way, the transit is adapted to fit snugly into the sleeve or the opening of the wall in which it is received, and the transit is adaptable to the actual mounting dimension. The mounting dimension is dictated by the inner diameter of the sleeve or the opening. The transit has a cylindrical compressible body, which is compressed axially between fittings at the opposite ends of the compressible body. By the axial compression, the cylindrical body will expand radially both inwards and outwards. Furthermore, the cables received may have different outer diameters, and, thus, the module is adaptable to cables having different outer diameters.

In some designs, a combined frame and compressible module may constitute the only, single transit element of the transit and therefore in effect constitute the transit as such. Other types of transits are also known in the technical field, as the skilled person is well aware of per se.

Local users may appear at a transit at different occasions and for different purposes. Of course, a technically qualified local user (or a team of such users) will appear at the transit during the actual installation of the transit elements and the cables running through it. Over time, a local user (or a team of such users) may appear at the transit when service, repair or upgrade is called for, or when maintenance or inspection is due.

Since there are typically a large number of transits at a site, or at different sites, it is not always easy for the local user to find the right transit. The present inventors have realized that, for this and other reasons that will appear to the reader of the following sections of this document, there will be a need for local user guidance at the different transits at a site or at different sites.

SUMMARY

It is accordingly an object of the invention to provide one or more improvements in the field of cable, pipe or wire transits when it comes to local user guidance.

A first aspect of the present invention therefore is a transit indicator device for use at or within a cable, pipe or wire transit having one or more transit elements for forming a sealed installation of one or more cables, pipes or wires. The transit indicator device comprises a communication interface to a communication network, and a visual indicator unit.

The transit indicator device also comprises a controller which is operatively connected with the communication interface and the visual indicator unit. The controller is configured to receive a remote instruction from the communication network via the communication interface and in response cause the visual indicator unit to provide a visual indication for guiding a local user (or a team of such users) at the transit.

In different embodiments, the visual indicator unit may, for instance, comprise a multi-color LED indicator being adapted to provide the visual indication for guiding the local user by generating light of a certain color among a plurality of available colors. Alternatively, the visual indicator unit may, for instance, comprise a set of LED indicators, each LED indicator being capable of indicating a respective color, and at least one of the LED indicators being adapted to provide the visual indication for guiding the local user by generating light of its respective color. Alternatively, the visual indicator unit may, for instance, comprise a display screen being adapted to provide the visual indication for guiding the local user by rendering graphical information on the display screen.

Additional features of the transit indicator device, its components as well as its functionality are described in the detailed description section and illustrated in the drawings.

A second aspect of the present invention is a user guidance system for cable, pipe or wire transits of a type which has one or more transit elements to form a sealed installation of one or more cables, pipes or wires. The user guidance system comprises a communication network, and a computer resource which is connectable to the communication network. The user guidance system further comprises a plurality of transit indicator devices in accordance with the first aspect of the present invention. Each transit indicator device is connectable to the communication network and is located at or within a respective transit.

The computer resource of the user guidance system is configured to receive a command from an authorized user, and in response send a remote instruction to one or more of the plurality of transit indicator devices over the communication network. This will cause said one or more transit indicator devices to provide a visual indication for guiding a local user (or a team of such users) at the respective transit(s) where said one or more transit indicator devices is/are located.

The user guidance system may be used for a variety of purposes. For instance, the remote instruction may be adapted to cause selective visual indication by a certain transit indicator device at a certain transit, preferably such that the selective visual indication is provided only by the certain transit indicator device at the certain transit and not by any other transit indicator devices at any other transits. Such selective visual indication may, for instance, be used to facilitate for the local user to locate the correct certain transit for installation, service, repair, maintenance, upgrade or inspection.

Another possible purpose may be to help the local user to associate a group of transits as having something in common. Hence, the remote instruction may be adapted to cause selective visual indication by a subset of transit indicator devices at a subset of the transits. Such selective visual indication by the subset of transit indicator devices may, for instance, be used to facilitate for the local user to know how to route cables, pipes or wires between transits in the subset of the transits. It may also be used in order to facilitate for the local user to locate a correct group of transits which have a common need for installation, service, repair, maintenance, upgrade or inspection.

Yet another possible purpose may be to make a visual indication at all transits in the system at the same time. To this end, the remote instruction may be adapted to cause visual indication by all transit indicator device at all transits. One reason for this may be to provide an alert in situations of emergency, or to indicate a sudden need for attention to all transits.

Each transit indicator device in the user guidance system according to the second aspect may have any or all of the features as described in this document for the transit indicator device according to the first aspect.

A third aspect of the present invention is a method of guiding a local user at a cable, pipe or wire transit having one or more transit elements to form a sealed installation of one or more cables, pipes or wires. The method comprises the following steps:

A computer resource receives a command from an authorized user. In response, the computer resource sends a remote instruction over a communication network to a transit indicator device located at or within the transit. The transit indicator device then provides a visual indication for guiding the local user (or a team of such users) at the transit.

The method according to the third aspect may have any or all of the functional features as described in this document for the transit indicator device according to the first aspect, and/or the user guidance system according to the second aspect.

Still other aspects and features of the invention and its embodiments are defined by the appended patent claims and are further explained, together with problems solved and advantages obtained, in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

DETAILED DESCRIPTION

Figure 1:
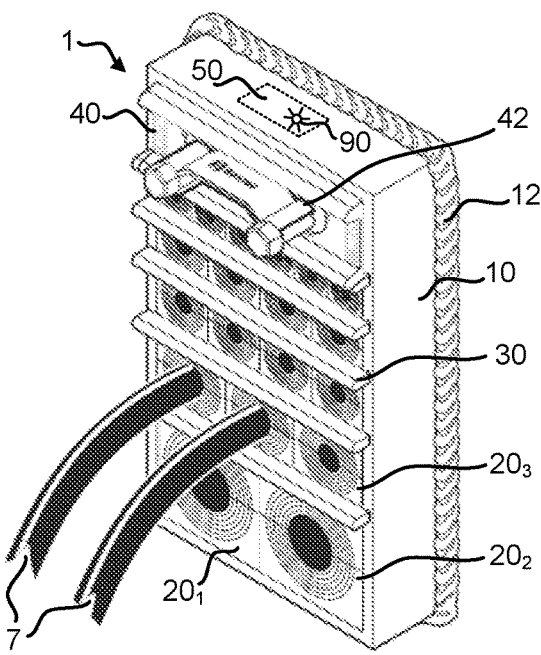
FIG. 1 is a schematic isometric view of a transit comprising a plurality of different transit elements which upon installation at a site have been assembled into a sealed installation of a plurality of cables.

Embodiments of the invention will now be described with reference to the accompanying drawings. The invention may, however, be embodied in many different forms and should not be construed as limited to the embodiments set forth herein: rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 schematically illustrates a transit 1, also known as a lead-through, comprising a plurality of different transit elements 10, 20, 30, 40, 42 which upon installation at a site have been assembled into a sealed installation of a plurality of cables [7]. Generally, the transit elements which make up a transit may be of different types and may exist as a single instance or as multiple instances, depending on implementation.

As seen in FIG. 1, the transit 1 comprises a frame 10, inside of which a plurality of compressible modules are arranged in different sizes and numbers (only three of the compressible modules being indicated as $20_1$, $20_2$ and $20_3$ in FIG. 1). The frame 10 of the transit 1 is mounted by means of a packing, sealing or weld joint 12.

Figure 2A:
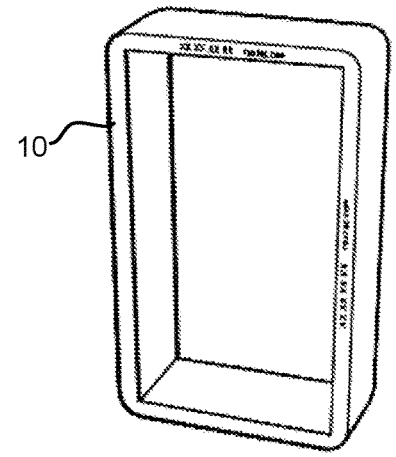
FIG. 2A is a schematic isometric view of a first type of transit element in the form of an essentially rectangular frame.
Figure 2B:
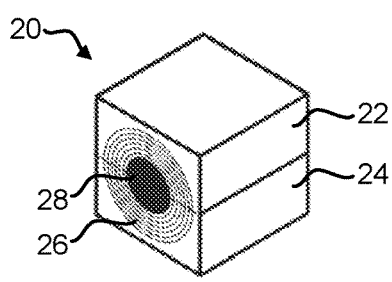
FIG. 2B is a schematic isometric view of a second type of transit element in the form of a compressible module.

A compressible module 20 is shown in FIG. 2B. The compressible module 20 has a box-shaped body which is divided into two halves 22, 24. A number of layers 26 of elastic material are concentrically arranged in the body 22, 24 around a center core 28. By removing the core 28 and peeling off a suitable number of layers 26 at installation, the compressible module 20 may be adapted to securely engage a cable [7] among cables of different diameters. In the example seen in FIG. 1, only two cables [7] are mounted in two respective modules 20; the remainder of the modules 20 in FIG. 1 are currently not used for cable lead-through and therefore still have the respective cores 28 in place.

As is clear from FIG. 1, a (main) transit element type (such as a compressible module 20) may in turn appear in different (sub) types, for instance differentiated by size (see modules $20_2$ and $20_3$ in FIG. 1).

Figure 2C:
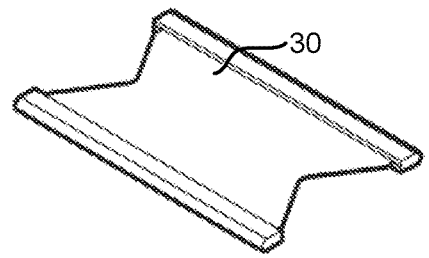
FIG. 2C is a schematic isometric view of a third type of transit element in the form of a stayplate.

FIG. 2C illustrates a third type of transit element in the form of a stayplate 30 which, as is seen in FIG. 1, is used to separate different rows of compressible modules 20 in the frame 10.

Figure 2D:
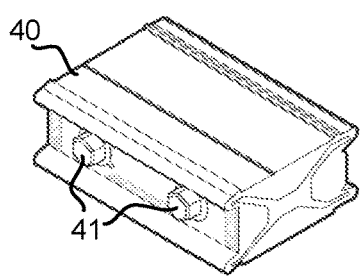
FIG. 2D is a schematic isometric view of a fourth type of transit element in the form of a wedge or compression unit.
Figure 2E:
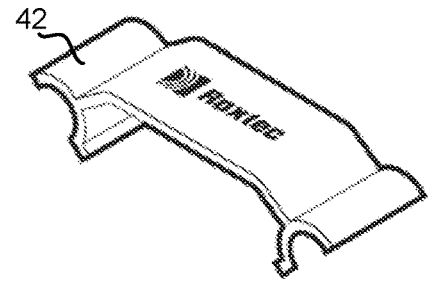
FIG. 2E is a schematic isometric view of a fifth type of transit element in the form of a wedge clip.

FIG. 2D illustrates a fourth type of transit element in the form of a wedge or compression unit 40. A fifth type of transit element in the form of a wedge clip 42 is seen in FIG. 2E. The compression unit 40 is placed between the frame 10 and the modules 20 in such a way that when the compression unit is expanded, the compressible modules will be compressed around the cables [7] such that a sealed installation is achieved. When the compression unit has been sufficiently expanded, its tightening members (bolts or screws) 41 will protrude far enough for the wedge clip 42 to be attached onto them. Hence, when the wedge clip 42 is attached, it is an indication that the compression unit has been sufficiently expanded. Alternatively or additionally, the wedge clip 42 may serve to prevent accidental loosening (de-expansion) of the compression unit 40.

Figure 3:
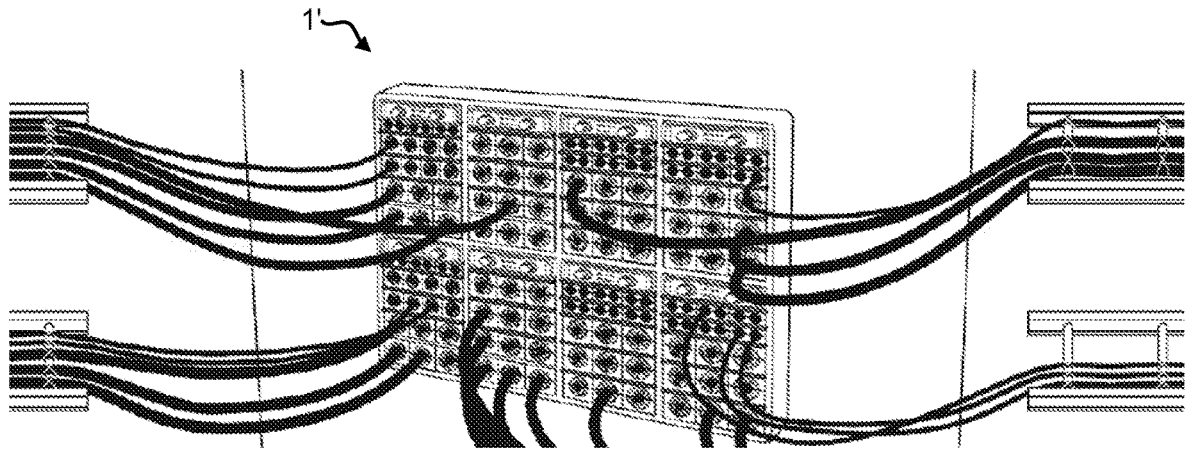
FIG. 3 is a schematic isometric view of a more complex transit.

It is to be noticed that different transits may vary considerably in size and complexity, depending on the nature and implementation requirements at the installation site in question. FIG. 3 shows an example of a more complex transit 1'.

As indicated above in the background section of this document, there is a general need for local user guidance at one or more transits in operation at one or more sites. To this end, and pursuant to the present invention, a transit indicator device as well as a user guidance system are provided in various embodiments which will now be described with reference to the remaining drawings. Embodiments of the transit indicator devices are indicated as 50, 50a-50n, 250, 350, 450 in the drawings, whereas the user guidance system is indicated as 2.

Figure 5A:
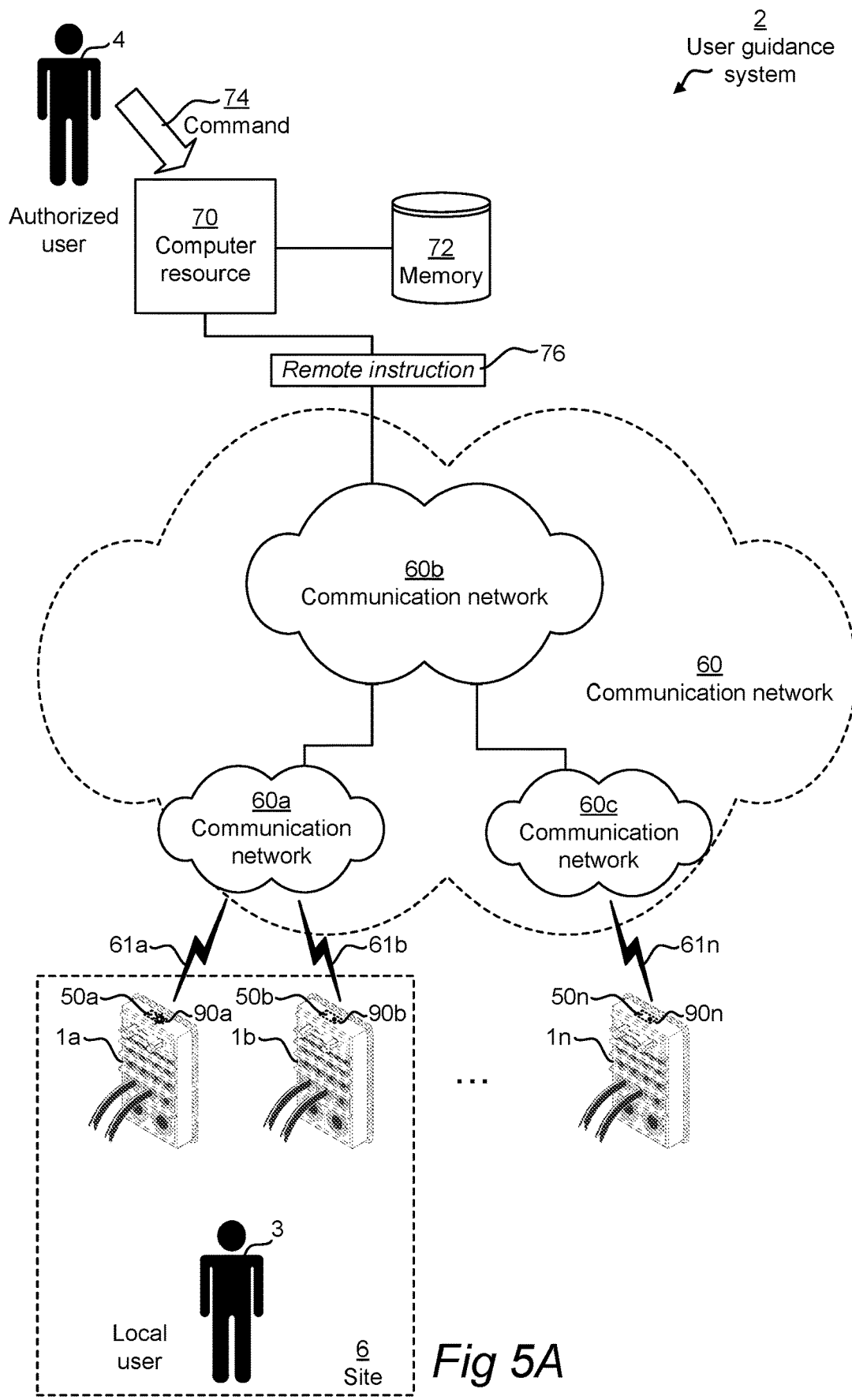
FIGS. 5A, 5B and 5C are schematic illustrations of a user guidance system for cable, pipe or wire transits according to some embodiments.

Starting with the user guidance system 2, one embodiment thereof is shown in FIG. 5A. The user guidance system 2 is for cable, pipe or wire transits 1a . . . 1n of a type which has one or more transit elements to form a sealed installation of one or more cables [7], pipes or wires. Such transit elements may, for instance, be any or all of transit elements 10, 20, 30, 40 and 42 in FIGS. 1 and 2A-2E, or, for instance, a combined frame and compressible module 400 which will be described in more detail with reference to FIGS. 10A-10C.

The user guidance system 2 comprises a communication network which is generally indicated as 60, and a computer resource 70 which is connectable to the communication network 60. The user guidance system 2 further comprises a plurality of transit indicator devices 50a-50n, each being connectable to the communication network 60 (or parts or extensions thereof) and each being located at or within a respective transit 1a-1n. Some of the transits may, for instance, be located at a same site 6, as can be seen for transits 1a and 1b in FIG. 5A. Others can be located outside of the site 6 (i.e. at another site), as can be seen for transit 1n in FIG. 5A.

The computer resource 70 and the transit indicator devices 50a-50n are operably connected by the communication network 60, or parts or extensions thereof. Such parts or extensions are indicated as 60a-c, 61, 61a-n and 62 in this document. The communication network 60 and its parts or extensions 60a-c, 61, 61a-n and 62 may be mobile telecommunication network(s) (compliant with any commercially available mobile telecommunication standard, for instance (without limitation) GSM, UMTS, LTE, LTE+, LTE Advanced, D-AMPS, CDMA2000, FOMA and TD-SCDMA), wide area data network(s) (such as an IP based data network in the form of the Internet or a part thereof), local area network(s) (such as a WiFi/WLAN, Bluetooth or LAN network), industrial data bus(es) (such as ASI, CANbus, ProfiBus or Modbus), or low frequency wireless data communication technology (such as LoRa), including any combination thereof. As is seen in FIG. 5A, in one embodiment, the transit indicator devices 50a-50n connect to local area networks 60a, 60c via wireless links 61a-61n, whereas the computer resource 70 connects to a wide area network 60b that the local area networks 60a, 60c are connected to in turn. Alternatively, as can also be seen in FIG. 5A, all devices may be connected to one common wide area network 60 being, for instance, the Internet or a part of it.

The computer resource 70 may, for instance, be implemented as a server computer, workstation computer, personal computer or laptop computer, having an operating system and being appropriately programmed to perform the functionalities described in this document, or as a cluster of such computer devices, or as a cloud computing service. The computer resource 70 may have an associated memory or storage 72, as is of course utterly well-known per se to the skilled person.

The computer resource 70 is configured to receive a command 74 from an authorized user 4. In some implementations, the authorized user 4 may submit the command 74 directly to the computer resource 70. In other implementations, particularly where the computer resource 70 is a shared computer resource such as a server computer resource or a cloud computer resource, the authorized user 4 may submit the command 74 to the computer resource 70 via a computer device. Such a computer device can be seen at 4a in FIG. 5B and may, for instance, be a personal computer, laptop computer, workstation, mobile terminal or tablet computer.

In response to receiving the submitted command 74, the computer resource 70 is configured to send a remote instruction 76 to one or more of the plurality of transit indicator devices 50a-50n over the communication network 60; 60a-c; 61, 61a-n, 62, thereby causing said one or more transit indicator devices 50a-50n to provide a visual indication for guiding a local user 3 at the respective transit(s) 1a-1n where said one or more transit indicator devices 50a-50 is/are located. To this end, each transit indicator device 50a-50n has a visual indicator unit 90a-90n.

Figure 4:
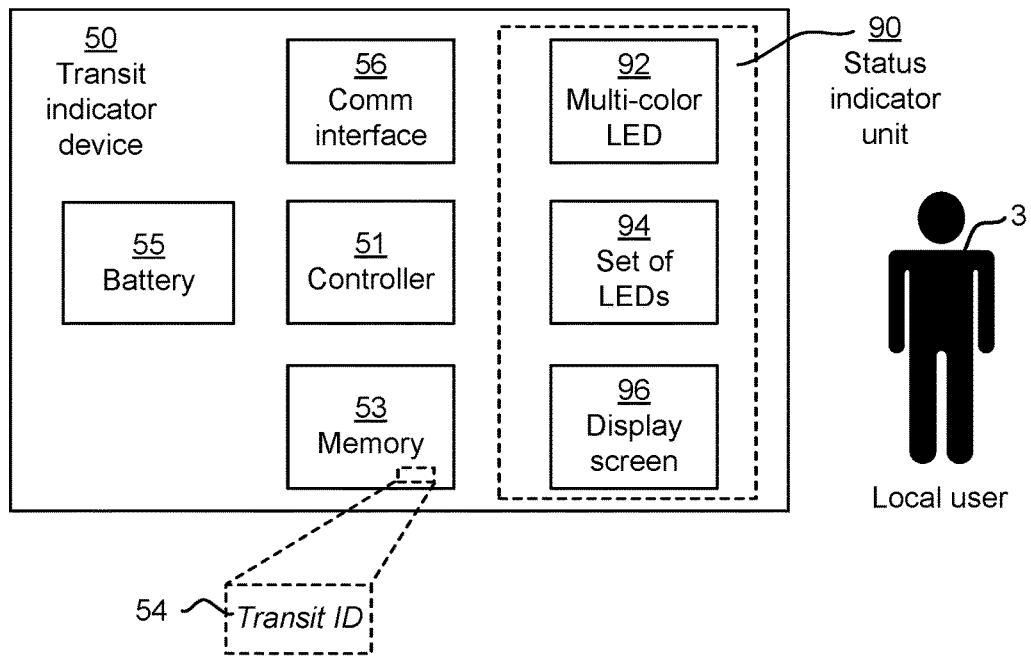
FIG. 4 is a schematic block diagram of the transit indicator device according to one embodiment.

As is seen in FIG. 4, the transit indicator device 50 (which may be one of the transit indicator devices 50a-50n in FIG. 4) comprises a controller 51 that takes care of the overall operation of the transit indicator device 50. The transit indicator device 50 also comprises a memory 53, a battery 55 or other power source, and a communication interface 56 to the communication network 60; 60a-c; 61, 61a-n, 62.

The transit indicator device 50 moreover comprises a status indicator unit 90. The controller 51 is operatively connected with the communication interface 56 and the visual indicator unit 90. The controller 51 is configured to receive the remote instruction 76 from the communication network 60; 60a-c; 61, 61a-n, 62 via the communication interface 56 and in response cause the visual indicator unit 90 to provide a visual indication for guiding the local user 3 at the transit 1 where the transit indicator device 50 is located.

In some implementations, the status indicator unit 90 of the transit indicator device 50; 50a-50n comprises at least one multi-color LED indicator 92 being adapted to provide the visual indication for guiding the local user 3 by generating light of a certain color among a plurality of available colors. In some implementations, the status indicator unit 90 of the transit indicator device 50; 50a-50n comprises a set of LED indicators 94, each LED indicator being capable of indicating a respective color, and at least one of the LED indicators being adapted to provide the visual indication for guiding the local user 3 by generating light of its respective color. In some implementations, the status indicator unit 90 of the transit indicator device 50; 50a-50n comprises a display screen 96 being adapted to provide the visual indication for guiding the local user 3 by rendering graphical information on the display screen 94. Combinations are also possible where the status indicator unit 90 of the transit indicator device 50 comprises at least one multi-color LED indicator 92, and/or a set of LED indicators 94, and/or a display screen 96.

In some embodiments, the transit indicator device 50; 50a-50n has a first mode in which no visual indication is provided by the visual indicator unit 90; 90a-90n, and a second mode in which the visual indication is provided by the visual indicator unit 90; 90a-90n. The controller 51 is configured, when receiving the remote instruction 76 generated in response to the command 74 by the authorized user 4, to cause the visual indicator unit 90; 90a-90n to provide the visual indication for guiding the local user 3 by switching from the first mode to the second mode. The first mode in which no visual indication is provided may typically be a state where an indicator of the visual indicator unit 90; 90a-90n (e.g. multi-color LED indicator 92 or LED indicator 94) is turned off. The second mode may typically be a state where the indicator is driven to generate light of a certain color.

In some embodiments, the transit indicator device 50; 50a-50n has a first mode in which a first visual indication is provided by the visual indicator unit 90; 90a-90n, and a second mode in which a second visual indication is provided by the visual indicator unit 90; 90a-90n. The controller 51 is configured, when receiving the remote instruction 76, to cause the visual indicator unit 90; 90a-90n to provide the visual indication for guiding the local user 3 by entering into the first mode or the second mode depending on a content 78 of the remote instruction 76. The first mode may typically be a state where the indicator of the visual indicator unit 90; 90a-90n is driven to generate light of a first color, whereas the second mode may typically be a state where the indicator is driven to generate light of a second color.

In some embodiments, the visual indicator unit 90; 90a-90n is configured to provide the visual indication for guiding the local user 3 by generating light of a certain color, wherein the certain color is blue or white.

Figure 6:
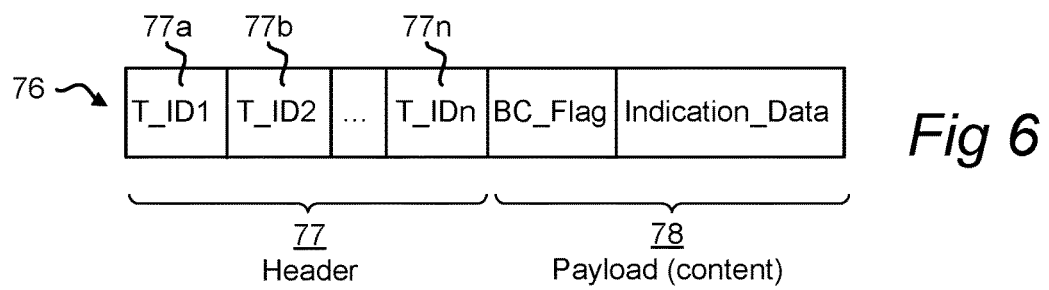
FIG. 6 is a schematic illustration of a composition of a remote instruction according to one embodiment.

FIG. 6 illustrates an exemplifying composition, or message format, of the remote instruction 76 according to one embodiment. The remote instruction 76 has a header portion 77 and a payload portion 78 for conveying content. The header portion 77 may be used to specify the individual transit indicator devices 50a-50n that the remote instruction 76 is intended for. The individual transit indicator devices 50a-50n may be addressed by respective transit identities (T_ID1 . . . T_IDn in FIG. 6) in the header portion 77. To this end, the memory 53 may store the transit identity of the particular transit indicator device 50. This can be seen as Transit ID 54 in FIG. 4. The payload portion 78 may contain data (Indication_Data in FIG. 6) specifying the indication to be provided by the individual transit indicator devices 50a-50n that the remote instruction 76 is intended for. The data may, for instance, specify a code of a current color to be indicated by the multi-color LED indicator 92, or a color corresponding to one LED in the set of single-color LED indicators 94. The code may, for instance be a binary code like:

| Color code | LED color to indicate |
|---|---|
| 000 | None (LED turned off) |
| 001 | Blue |
| 010 | White |
| 011 | Green |
| 100 | Yellow |
| 101 | Red |

Additionally or alternatively, the data may specify a flash pattern of the multi-color LED indicator 92 or individual LED in the set of single-color LED indicators 94. The flash pattern may, for instance, be specified as:

| Flash code | Flash pattern |
|---|---|
| 00 | None (LED turned off) |
| 01 | Slow |
| 10 | Medium |
| 11 | Fast |

Additionally or alternatively, the data may specify a graphical symbol or text to be indicated by the graphical display 94.

In some embodiments, the payload portion 78 may have a broadcast flag (BC_Flag in FIG. 6) to indicate that all receiving transit indicator devices 50a-50n shall provide the specified indication.

Figure 5B:
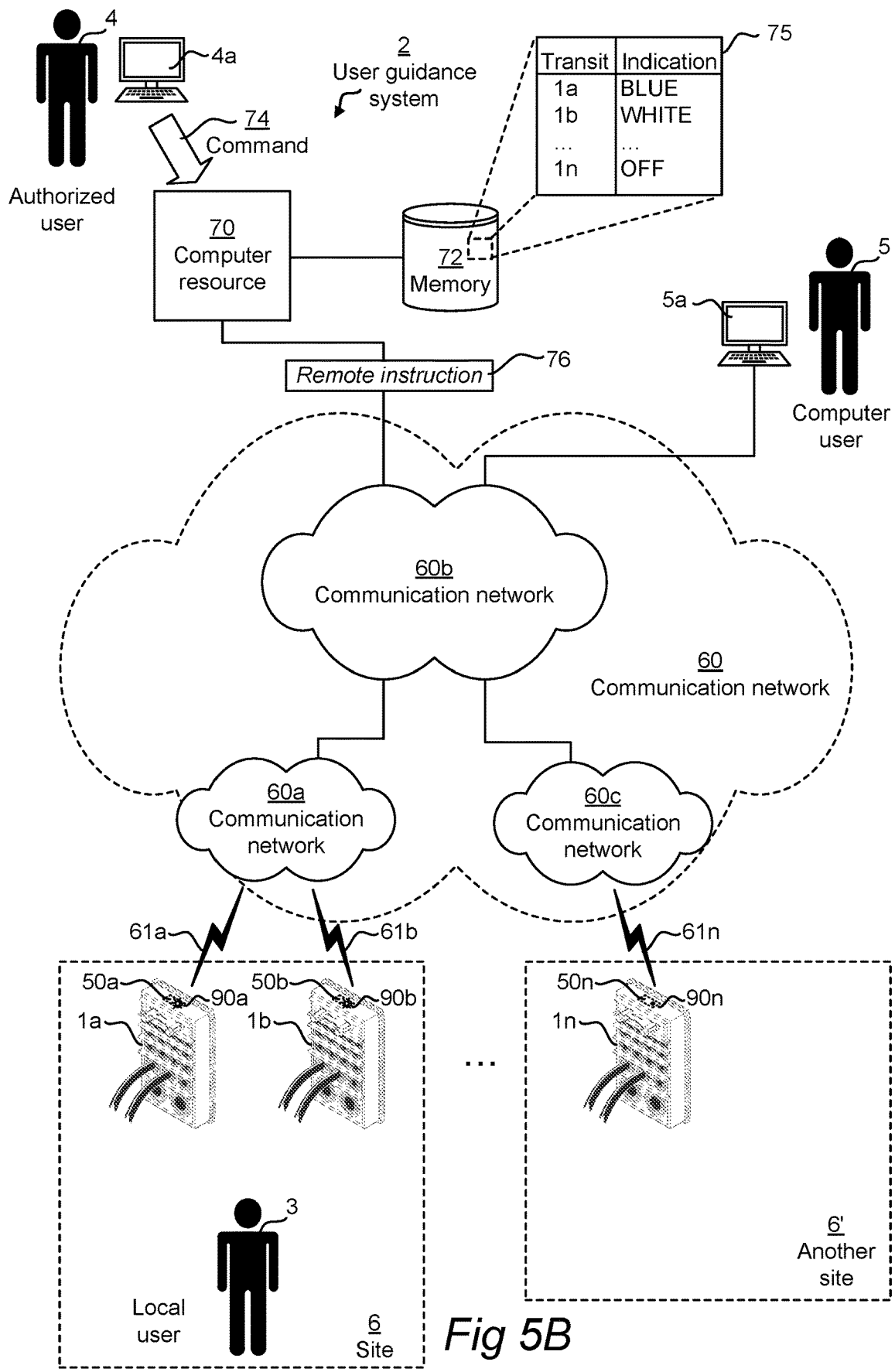

As can be seen in FIG. 5B, the computer resource 70 may store the current indications of the different transit indicator devices 50a-50n (i.e., for the different transits 1a-1n) in a data structure 75 in the memory 72. The data structure 75 may be updated every time the authorized user 4 (or another authorized user) submits a command 74 pertaining to one of the transit indicator devices 50a-50n/transits 1a-1n in the user guidance system 2 to the computer resource 70. The data structure 75 may contain one or more table columns (or similar structure) representing the different transit indicator devices 50a-50n or transits 1a-1n, and one or more table columns (or similar structure) representing the current indications of the respective transit indicator devices 50a-50n/transits 1a-1n. The current indications may, for instance, be represented by the aforementioned color codes and/or flash codes.

Accordingly, the computer resource 70 in the user guidance system 2 is configured to store data representing current visual indications of the transit indicator devices 50a-50n of the user guidance system in the data structure 75 in the memory 72. The computer resource 70 is moreover configured, as the computer resource 70 receives from the authorized user 4, or from another authorized user, a command 74 which (as previously described) is intended for one or more of the transit indicator devices 50a-50n, to update the data structure 75 so as to reflect a change in visual indication provided by the one or more transit indicator devices 50a-50n as defined by the command 74.

The computer resource 70 in the user guidance system 2 is further configured to receive a query from a computer user 5 of the user guidance system, wherein the query pertains to one or more of the transit indicator devices 50a-50n of the user guidance system. The computer resource 70 retrieves data representing the current visual indications of the queried one or more transit indicator devices 50a-50n from the data structure 75 in the memory 72, and accordingly responds to the computer user 5 with response information, wherein the response information comprises all or part of the retrieved data, or is derived from all or part of the retrieved data.

The provision of the data structure 75 in the memory 72 thus makes it possible for one or more computer users 5 of the user guidance system 2 to obtain information about the current indications of the transit indicator devices 50a-50n/transits 1a-1n. The or each computer user 5 may be a remote user that makes the query via the communication network 60; 60b, as can be seen in FIG. 5B. To this end, the computer user 5 may use a computer device 5a (such as, for instance, a personal computer, laptop computer, workstation, mobile terminal or tablet computer) to query the computer resource 70 or the memory 72 about the contents of the data structure 75.

Reference is now again made to the illustration of the transit indicator device 50 in FIG. 4. The controller 51 of the transit indicator device 50 may, for instance, be implemented as a central processing units (CPU), digital signal processor (DSP), application-specific integrated circuit (ASIC), field-programmable gate array (FPGA), or generally by any electronic circuitry capable of performing the functionalities as described herein. The memory 53 may, for instance, be implemented in any commonly known technology for electronic memories, such as ROM, RAM, SRAM, DRAM, CMOS, FLASH, DDR or SDRAM.

The communication interface 56 may, for instance, be implemented as IEEE 802.11, IEEE 802.15, ZigBee, WirelessHART, WiFi, Bluetooth, WCDMA, HSPA, GSM, UTRAN, UMTS, LTE, LTE+, LTE Advanced, D-AMPS, CDMA2000, FOMA, TD-SCDMA ASI, CANbus, ProfiBus, Modbus, or as LoRa or other low frequency wireless data communication technology.

Figure 5C:
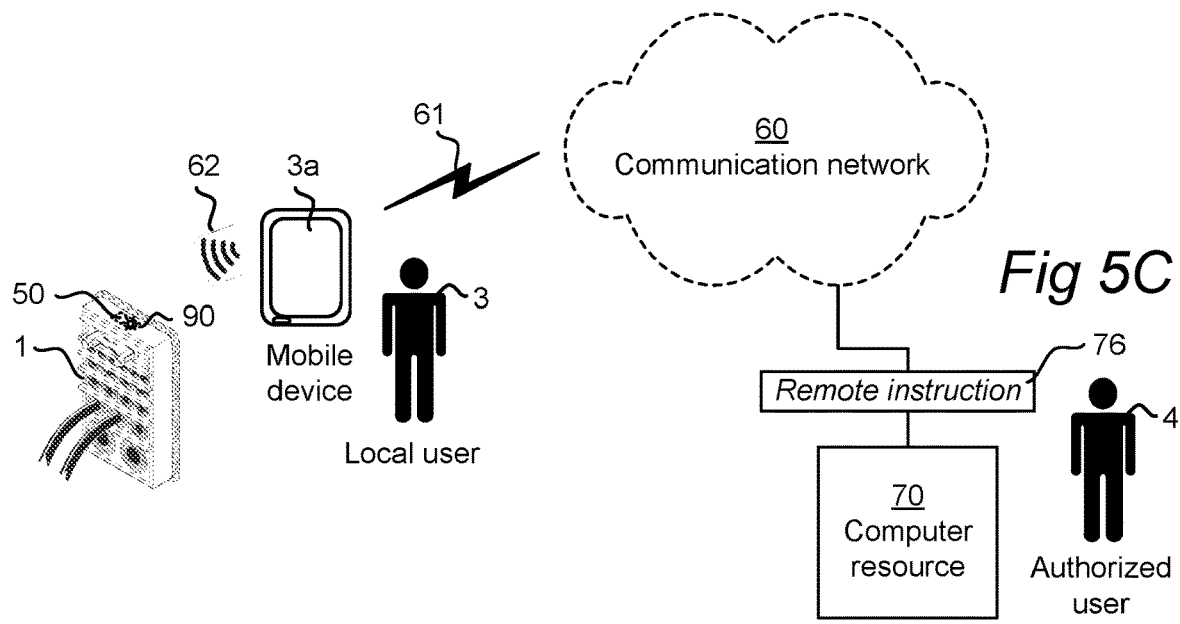

As can be seen in the embodiment shown in FIG. 5C, the local user 3 may have a mobile device 3a which is used to bridge or relay communication between the transit indicator device 50 and the communication network 60/computer resource 70. The mobile device 3a may, for instance, be a mobile terminal, tablet computer or laptop computer. It may have an application program (app) by means of which the mobile device 3a may receive a remote instruction 76 from the computer resource 70 over a wireless link 61 to the communication network 60, as previously discussed. As can be seen in FIG. 5C, the application program in the mobile device 3a may then communicate the remote instruction 76, or at least the semantic meaning thereof, to the transit indicator device 50 over another wireless link 62.

The wireless link 61 may be a mobile telecommunication link pursuant to GSM, UMTS, LTE, LTE+, LTE Advanced, D-AMPS, CDMA2000, FOMA or TD-SCDMA, or similar. The wireless link 62 may be a short-range wireless communication link such as, for instance, Bluetooth or NFC. Thanks to the usage of the mobile device 3a as an intermediate communication bridge or relay, the wireless link 62 does not have to be long-range. As can be understood from the above, the wireless link 62 (as well as the wireless link 61) is thus an extension of the general communication network 60, making the transit indicator device 50 and its communication interface 56 connectable to the general communication network 60 as such.

The transit indicator device 50; 50a-50n may generally be provided in any suitable way at or within the transit 1; 1a-1n. For instance, it may be attached to a transit element, such as for instance to a compression unit in the transit, like the wedge 40 shown in FIGS. 1 and 2D. It is recalled that the compression unit or wedge 40 is actuated by one or more tightening members, in the disclosed embodiment two tightening members 41 (see FIG. 2D), to achieve a sealed installation of the cables of the transit. These tightening members may also be used for anchoring the transit indicator device 50; 50a-50n to the transit 1; 1a-1n. Alternatively, it may be attached to another transit element, such as for instance the frame 10 shown in FIGS. 1 and 2A, by appropriate fastening means such as screws, bolts or glue. Generally, therefore, the transit indicator device 50; 50a-50n may comprise a housing adapted for mounting onto a transit element of the transit 1; 1a-1n.

Figure 10A:
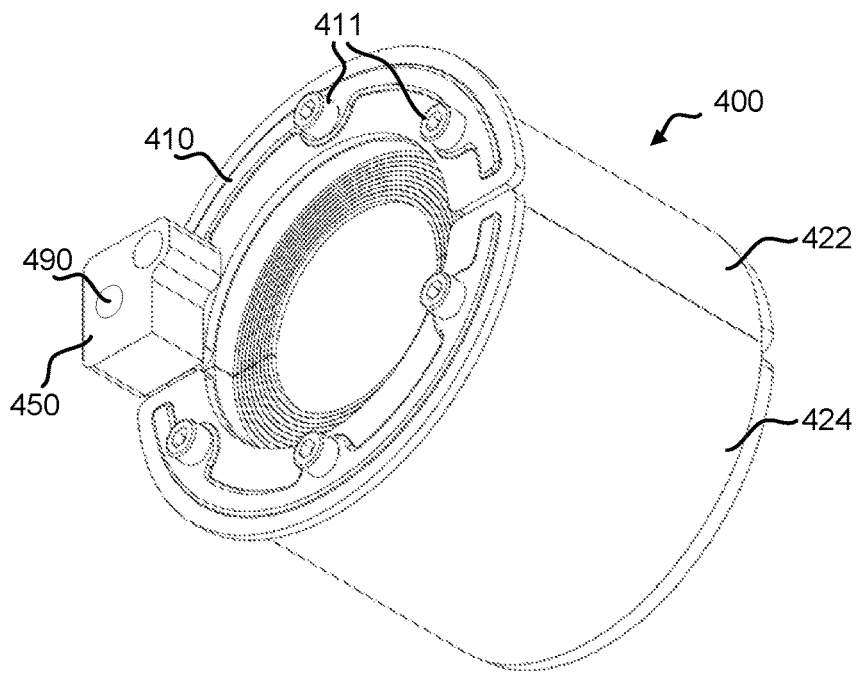
FIGS. 10A, 10B and 10C are schematic isometric views of a transit indicator device according to still another embodiment.
Figure 10B:
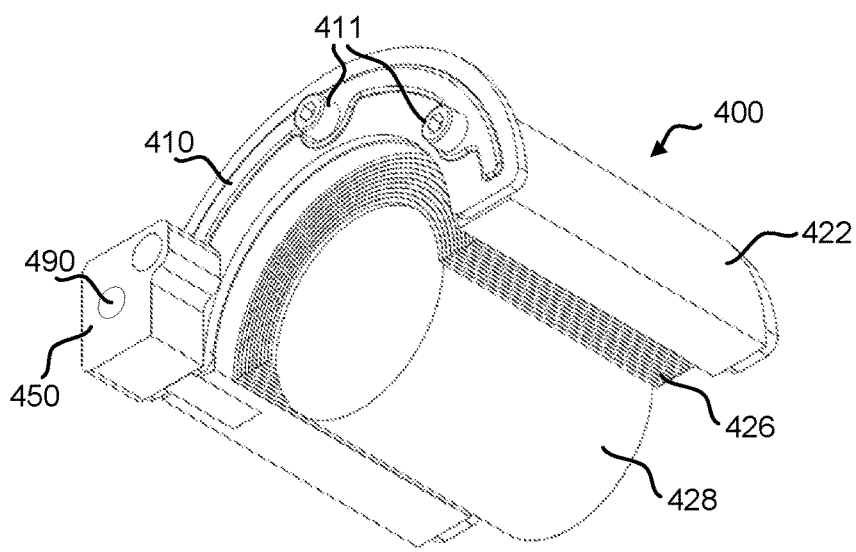
Figure 10C:
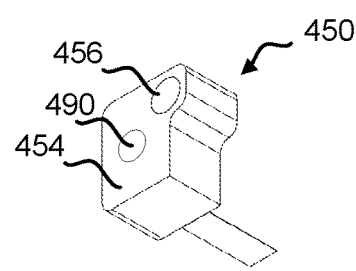

FIGS. 10A-C illustrate a transit indicator device 450 according to one embodiment. In this embodiment, the transit indicator device 450 is adapted for mounting to a transit element in the form of a combined frame and compressible module 400. The combined frame and compressible module 400 has a cylindrical body portion which is divided into two halves 422, 424. A number of layers 426 of elastic material are concentrically arranged in the body 422, 424 around a center core 428. By removing the core 428 and peeling off a suitable number of layers 426 at installation, the combined frame and compressible module 400 may be adapted to securely engage a given cable among cables of different diameters.

The combined frame and compressible module 400 also has a frame portion 410. The frame portion 410 has fastening members 411, such as bolts or screws. The transit indicator device 450 is mounted to the combined frame and compressible module 400 by means of one of these fastening members, as can be seen in FIGS. 10A and 10B. As can be seen in FIG. 10C, the transit indicator device 450 has a housing 454 with an opening 456 for receiving one of the fastening members 411. The transit indicator device 450 also has a status indicator unit 490 functioning like the status indicator unit 90 previously described; it may for instance comprise a multi-color LED indicator or a number of LED indicators of different colors (like the aforementioned multi-color LED indicator 92 or the set of LED indicators 94, respectively).

It is to be noticed that the combined frame and compressible module 400 may constitute the only, single transit element of the transit 1 and therefore in effect constitute the transit 1 as such.

As an alternative to being attached to a transit element of the transit 1; 1a-1n, the transit indicator device 50; 50a-50n may be mounted to a structure close to the transit. Such a structure may, for instance be a wall, door, hatch or window.

Figure 8A:
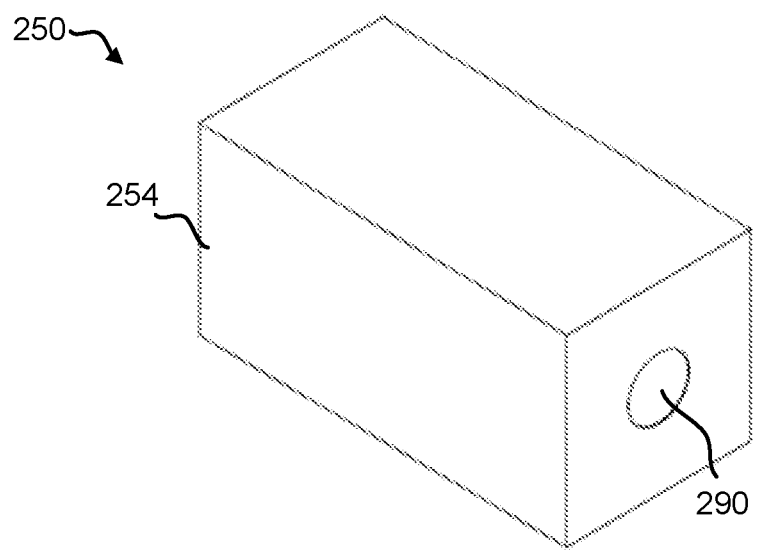
FIGS. 8A, 8B and 8C are schematic isometric, side and front views, respectively, of a transit indicator device according to one embodiment.
Figures 8B, 8C:
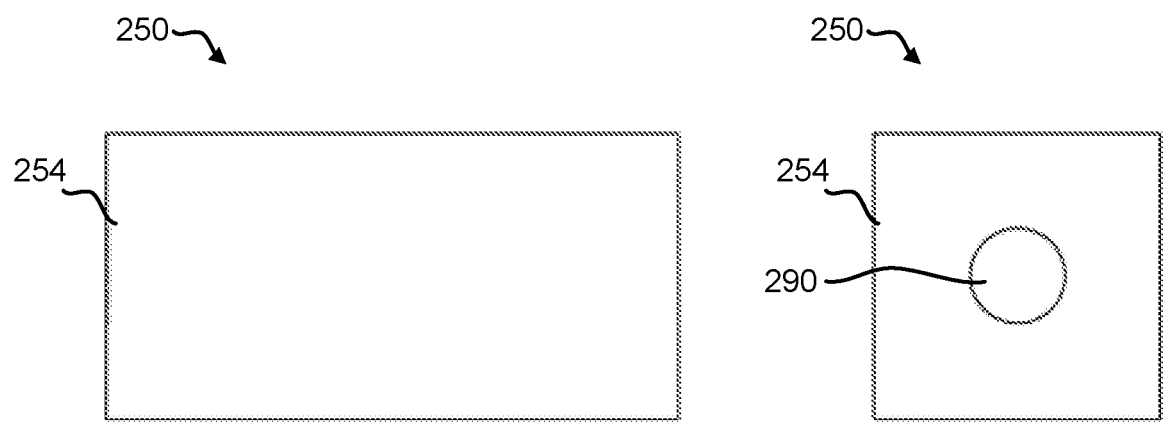

As a further alternative, the transit indicator device 50; 50a-50n may be provided within the transit 1; 1a-1n. To this end, the transit indicator device 50; 50a-50n may be of the same general shape as one type of transit element for the transit 1; 1a-1n, or of a component 28 of said one type of transit element. See, for instance, FIGS. 8A-C which illustrate a transit indicator device 250 according to an alternative embodiment. In this alternative embodiment, the transit indicator device 250 is of the same general shape as one type of transit element for the transit 1 in question, or, more specifically for the embodiment shown in FIGS. 8A-C, of the same general shape as a compressible module 20 (such as, for instance, the one shown in FIGS. 1 and 2A). As can be seen in FIGS. 8A-C, the transit indicator device 250 has a housing 254 of the same general shape as the compressible module 20. The transit indicator device 250 has a status indicator unit 290 functioning like the status indicator unit 90 previously described; it may for instance comprise a multi-color LED indicator or a number of LED indicators of different colors (like the aforementioned multi-color LED indicator 92 or the set of LED indicators 94, respectively).

The transit indicator device 250 is adapted to be mounted instead of the compressible module 20 in the transit 1. Hence, the transit indicator device 250 replaces or takes the place of one of the transit elements of the transit 1—namely one of the compressible modules 20—during assembly of the transit elements into the sealed installation of one or more cables, pipes or wires.

Figure 9A:
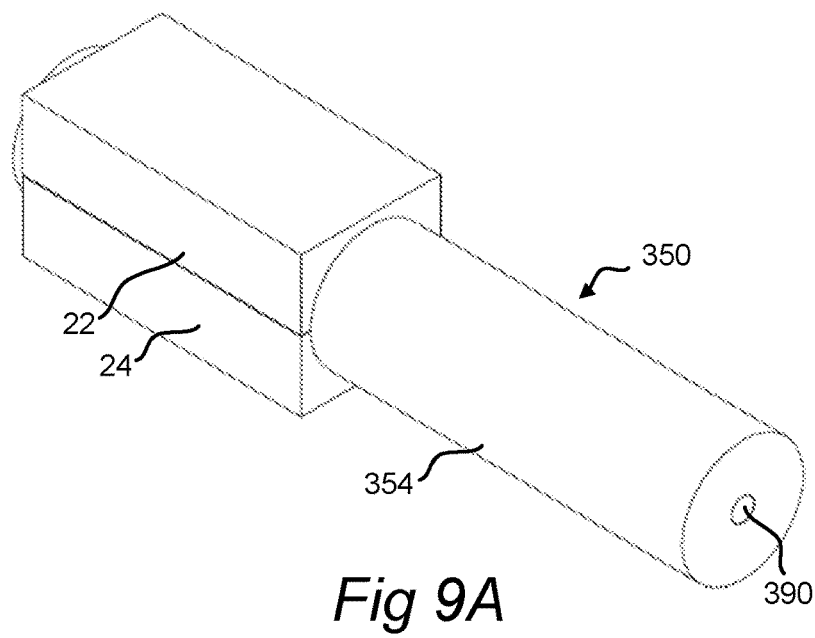
FIGS. 9A, 9B and 9C are schematic isometric, side and front views, respectively, of a transit indicator device according to another embodiment.
Figure 9B:
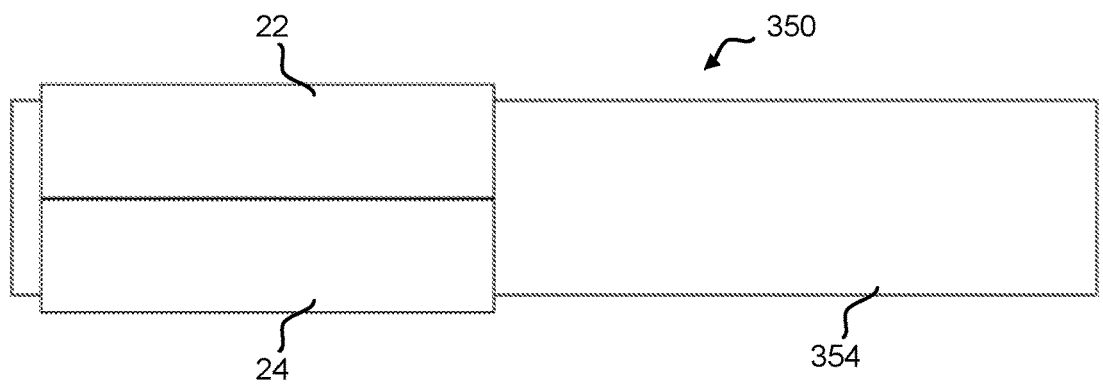
Figure 9C:
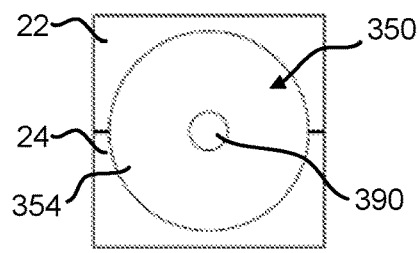

FIGS. 9A-C illustrate a transit indicator device 350 according to an alternative embodiment. In this alternative embodiment, the transit indicator device 350 is of the same general shape as a component of said one type of transit element for the transit 1 in question, or, more specifically for the embodiment shown in FIGS. 9A-C, of the same general shape as a core 28 of a compressible module 20 (such as, for instance, the one shown in FIGS. 1 and 2A). As can be seen in FIGS. 9A-C, the transit indicator device 350 has a housing 354 of the same general shape as the core 28 of the compressible module 20. The transit indicator device 350 has a status indicator unit 390 functioning like the status indicator unit 90 previously described; it may for instance comprise a multi-color LED indicator or a number of LED indicators of different colors (like the aforementioned multi-color LED indicator 92 or the set of LED indicators 94, respectively).

The transit indicator device 350 is adapted to be mounted instead of the core 28 of the compressible module 20 in the transit 1. Hence, the transit indicator device 350 replaces or takes the place of a component of one of the transit elements of the transit 1—namely the core 28 of one of the compressible modules 20—during assembly of the transit elements into the sealed installation of one or more cables, pipes or wires.

Figure 11:
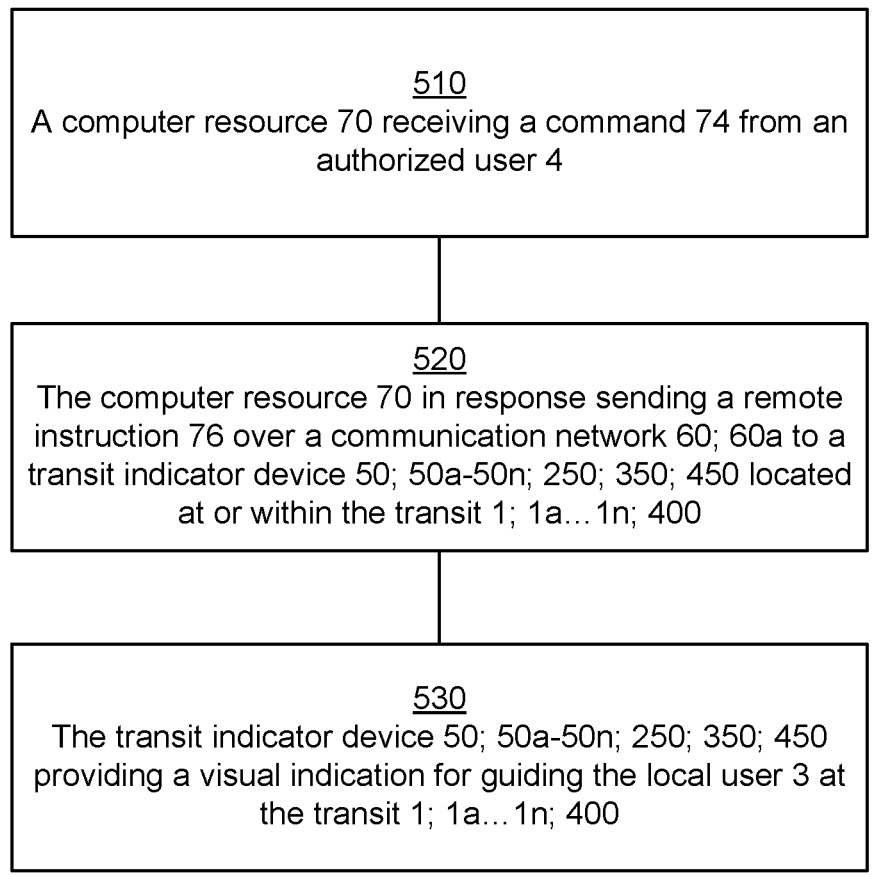
FIG. 11 is a schematic flowchart diagram illustrating a method according to the invention.

Reference is now made to FIG. 11, which is a schematic flowchart diagram illustrating a method 500 of guiding the local user 3 at a cable, pipe or wire transit 1; 1a . . . 1n; 400 according to the invention.

In a first step 510, the computer resource 70 receives the command 74 from the authorized user 4.

In a second step 520, the computer resource 70 in response sends the remote instruction 76 over the communication network 60; 60a-c; 61, 61a-n, 62 to a transit indicator device 50; 50a-50n; 250; 350; 450 located at or within the transit 1; 1a . . . 1n; 400.

In a third step 530, the transit indicator device 50; 50a-50n; 250; 350; 450 provides a visual indication for guiding the local user 3 at the transit 1; 1a . . . 1n; 400.

Some exemplifying use cases for the user guidance system 2 in FIGS. 5A-5C will now be described.

In one use case, the remote instruction 76 may be adapted to cause selective visual indication by a certain transit indicator device 50a at a certain transit 1a, preferably such that the selective visual indication is provided only by the certain transit indicator device 50a at the certain transit 1a and not by any other transit indicator devices 50b-50n at any other transits 1b-1n. This can be seen in FIG. 5A; the visual indicator unit 90a of the transit indicator device 50a at the transit 1a indicates light (see 90a), whereas the other transit indicator devices 50b-50n at the other transits 1b-1n are turned off (see 90b-90n). Such selective visual indication may, for instance, be used to facilitate for the local user 3 to locate the correct certain transit 1a for installation, service, repair, maintenance, upgrade or inspection.

Figure 7A:
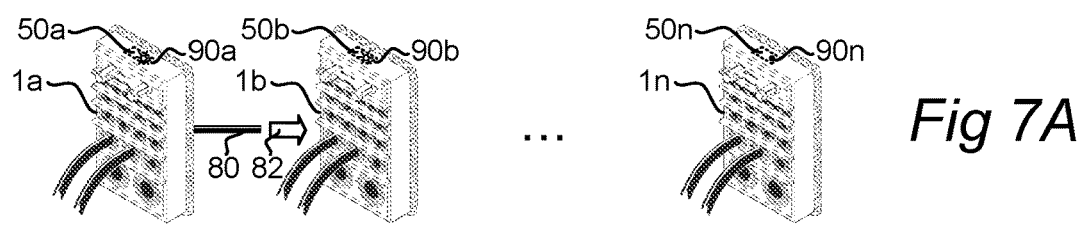
FIGS. 7A and 7B illustrate different exemplifying use cases.

Another use case involves helping the local user 3 to associate a group of transits as having something in common. Hence, the remote instruction 76 may be adapted to cause selective visual indication by a subset of transit indicator devices 50a-50b at a subset of the transits 1a-1b. This can be seen in FIGS. 5B and 7A. Such selective visual indication by the subset of transit indicator devices 50a-50b may, for instance, be used to facilitate for the local user 3 to know how to route 82 cables 80, pipes or wires between the transits 1a-1b in the subset of the transits. It may also be used in order to facilitate for the local user 3 to locate a correct group of transits which have a common need for installation, service, repair, maintenance, upgrade or inspection. Such a subset or group may involve transits at the same site 6 or at different sites 6' (FIG. 5B showing one such other site 6' being different from the site 6). Hence, the remote instruction 76 may be addressable to individual transit indicator units 50a, 50b located at or within transits 1a, 1b at the same site 6, as well as individual transit indicator units 50n located at or within transits 1n at another site 6' than this same site 6.

To this end, the remote instruction 76 may comprise addressing information 77a, 77b, 77n (see FIG. 6) for indicating a variable number of individual transit indicator units 50a, 50b, 50n that the remote instruction 76 is intended for. The addressing information 77a, 77b, 77n in the remote instruction 76 may comprise a respective transit identity T_ID1, T_ID2, T_IDn for each individual transit indicator unit 50a, 50b, 50n that the remote instruction 76 is intended for. The controller 51 in an individual transit indicator device 50 may thus be configured, when receiving the remote instruction 76, to check whether its transit identity 54 (preferably stored in local memory 53 as previously described) is included in the addressing information 77a, 77b, 77n in the received remote instruction 76, i.e. whether it matches any of the transit identity T_ID1, T_ID2, T_IDn in the remote instruction 76. If so, the controller 51 will cause the visual indicator unit 90 to provide the visual indication for guiding the local user 3.

Figure 7B:
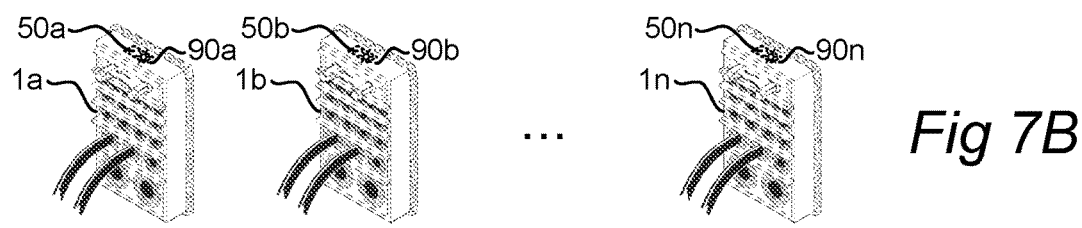

A third use case involves making a visual indication at all transits 1a-1n in the system 2 at the same time. To this end, the remote instruction 76 may be adapted to cause visual indication by all transit indicator device 50a-50n at all transits 1a-1n. This can be seen in FIG. 7B. One reason for this may be to provide an alert in situations of emergency, or to indicate a sudden need for attention to all transits.

To this end, the broadcast flag BC_Flag in the remote instruction 76 may be used for indicating that the remote instruction 76 is intended for all receiving transit indicator devices 50a-50n. The controller 51 in an individual transit indicator device 50 may thus be configured, when receiving the remote instruction 76, to check whether the broadcast flag BC_Flag of the received remote instruction 76 is set. If so, the controller 51 will cause the visual indicator unit 90 to provide the visual indication for guiding the local user 3.

Advantageously, the user guidance system 2 and its components (the computer resource 70 and the transit indicator devices 50; 50a-50n are configured to support all of the first to three uses cases referred to above. Hence, the remote instruction 76 is capable to cause selective visual indication by a certain transit indicator device at a certain transit in the user guidance system 2, to cause selective visual indication by a subset of transit indicator devices in the user guidance system 2 (at the same site or at different sites), and to cause visual indication by all transit indicator devices in the user guidance system 2, depending on the command 74 provided by the authorized user 4. The computer resource 70 is configured to receive the command 74 from the authorized user 4, determine from the command 74 whether it pertains to the first use case, second use case or third use case, and accordingly configure the remote instruction 76 to cause selective visual indication by a certain transit indicator device or by a subset of the transit indicator devices in the user guidance system 2, or to cause visual indication by all transit indicator devices in the user guidance system 2.

The invention has been described above in detail with reference to embodiments thereof. However, as is readily understood by those skilled in the art, other embodiments are equally possible within the scope of the present invention, as defined by the appended claims.

The invention claimed is:

1. A transit indicator device comprising:
   a communication interface to a communication network;
   a visual indicator unit configured to have selectable modes, the visual indicator unit for use at or within a cable, pipe or wire transit having one or more transit elements for forming a sealed installation of one or more cables, pipes or wires; and
   a controller operatively connected with the communication interface and the visual indicator unit, the controller being configured to receive a remote instruction from the communication network via the communication interface, the remote instruction corresponding to at least one of the selectable modes, and in response to receiving the remote instruction cause the visual indicator unit to provide a visual indication for guiding a local user at the transit, wherein the visual indication corresponds to at least one of the selectable modes.

2. The transit indicator device as defined in claim 1, wherein the selectable modes of the transit indicator device comprises at least a first mode in which no visual indication is provided by the visual indicator unit, and a second mode in which the visual indication is provided by the visual indicator unit, and wherein the controller is configured, when receiving the remote instruction, to cause the visual indicator unit to provide the visual indication for guiding the local user by switching from the first mode to the second mode.

3. The transit indicator device as defined in claim 1, wherein the selectable modes of the transit indicator device comprises at least a first mode in which a first visual indication is provided by the visual indicator unit, and a second mode in which a second visual indication is provided by the visual indicator unit, and wherein the controller is configured, when receiving the remote instruction, to cause the visual indicator unit to provide the visual indication for guiding the local user by entering into the first mode or the second mode depending on a content of the remote instruction.

4. The transit indicator device as defined in claim 1, wherein the visual indicator unit is configured to provide the visual indication for guiding the local user by generating light of a certain color, wherein the certain color is blue or white.

5. The transit indicator device as defined in claim 1, wherein the visual indicator unit comprises one or more of the following:
   a multi-color LED indicator being adapted to provide the visual indication for guiding the local user by generating light of a certain color among a plurality of available colors;
   a set of LED indicators, each LED indicator being capable of indicating a respective color, and at least one of the LED indicators being adapted to provide the visual indication for guiding the local user by generating light of its respective color; and
   a display screen being adapted to provide the visual indication for guiding the local user by rendering graphical information on the display screen.

6. The transit indicator device as defined in claim 1, comprising a housing adapted for mounting onto a transit element of said transit.

7. The transit indicator device as defined in claim 1, wherein the transit indicator device is of the same general shape as one type of transit element for said transit, or of a component of said one type of transit element.

8. The transit indicator device as defined in claim 7, wherein said one type of transit element is a compressible module and wherein the transit indicator device has a housing of the same general shape as the compressible module, the transit indicator device being adapted to be mounted instead of the compressible module in the transit.

9. The transit indicator device as defined in claim 7, wherein said one type of transit element is a compressible module and wherein the transit indicator device has a housing of the same general shape as a core of the compressible module, the transit indicator device being adapted to be mounted instead of the core of the compressible module in the transit.

10. The transit indicator device as defined in claim 1, wherein the transit element(s) of the transit is/are one or more of the following:
   a frame;
   a compressible module;
   a stayplate;

a compression unit;
a wedge clip; and
a combined frame and compressible module.

11. The transit indicator device as defined in claim 1 and having a transit identity, wherein the controller is configured, when receiving the remote instruction, to check whether the transit identity of the transit indicator device is included in addressing information in the received remote instruction, and, if so, cause the visual indicator unit to provide the visual indication for guiding the local user.

12. The transit indicator device as defined in claim 1 and having a transit identity, wherein the controller is configured, when receiving the remote instruction, to check whether a broadcast flag is set in the received remote instruction, and, if so, cause the visual indicator unit to provide the visual indication for guiding the local user.

13. A user guidance system for cable, pipe or wire transits of a type which has one or more transit elements to form a sealed installation of one or more cables, pipes or wires, the user guidance system comprising:
a communication network;
a computer resource being connectable to the communication network; and
a plurality of transit indicator devices as defined claim 1, each being connectable to the communication network and each being located at or within a respective transit,
wherein the computer resource is configured to:
receive a command from an authorized user; and
in response send a remote instruction to one or more of the plurality of transit indicator devices over the communication network, thereby causing said one or more transit indicator devices to provide a visual indication for guiding a local user at the respective transit(s) where said one or more transit indicator devices is/are located.

14. The user guidance system as defined in claim 13, wherein the remote instruction is adapted to cause selective visual indication by a certain transit indicator device at a certain transit.

15. The user guidance system as defined in claim 14, wherein the selective visual indication is provided only by the certain transit indicator device at the certain transit and not by any other transit indicator devices at any other transits.

16. The user guidance system as defined in claim 14, wherein the selective visual indication serves to facilitate for the local user to locate the correct certain transit for installation, service, repair, maintenance, upgrade or inspection.

17. The user guidance system as defined in claim 13, wherein the remote instruction is adapted to cause selective visual indication by a subset of transit indicator devices at a subset of the transits.

18. The user guidance system as defined in claim 17, wherein the selective visual indication by the subset of transit indicator devices serves to facilitate for the local user to know how to route cables pipes or wires between transits in the subset of the transits.

19. The user guidance system as defined in claim 13, wherein the remote instruction is adapted to cause visual indication by all transit indicator device at all transits.

20. The user guidance system as defined in claim 13, wherein the remote instruction is addressable to individual transit indicator units located at or within transits at a same site as well as located at or within transits at another site than said same site.

21. The user guidance system as defined in claim 13, wherein the remote instruction comprises addressing information for indicating a variable number of individual transit indicator units that the remote instruction is intended for.

22. The user guidance system as defined in claim 21, wherein the addressing information in the remote instruction comprises a respective transit identity for each individual transit indicator unit that the remote instruction is intended for.

23. The user guidance system as defined in claim 13, wherein the remote instruction comprises a broadcast flag for indicating that the remote instruction is intended for all receiving transit indicator devices.

24. The user guidance system as defined in claim 13,
wherein the computer resource is configured to store data representing current visual indications of the transit indicator devices of the user guidance system in a data structure in a memory, and
wherein the computer resource is configured, as the computer resource receives from the authorized user, or from another authorized user, a command intended for one or more of the transit indicator devices, to update the data structure so as to reflect a change in visual indication provided by said one or more transit indicator devices as defined by said command.

25. The user guidance system as defined in claim 24, wherein the computer resource is further configured to:
receive a query from a computer user of the user guidance system, the query pertaining to one or more of the transit indicator devices of the user guidance system;
retrieve data representing the current visual indications of the queried one or more transit indicator devices from the data structure in the memory; and
respond to the computer user with response information, wherein the response information comprises all or part of the retrieved data, or is derived from all or part of the retrieved data.

26. A method of guiding a local user at a cable, pipe or wire transit having one or more transit elements to form a sealed installation of one or more cables, pipes or wires, the method comprising:
a computer resource receiving a command from an authorized user;
the computer resource in response sending a remote instruction over a communication network to a transit indicator device located at or within the transit; and
the transit indicator device providing a visual indication for guiding the local user at the transit, wherein the transit indicator device is configured to have selectable modes and the remote instruction corresponds to at least one of the selectable modes.

* * * * *